J. L. NIX.
INCUBATOR.
APPLICATION FILED SEPT. 3, 1907.
934,006.
Patented Sept. 14, 1909.
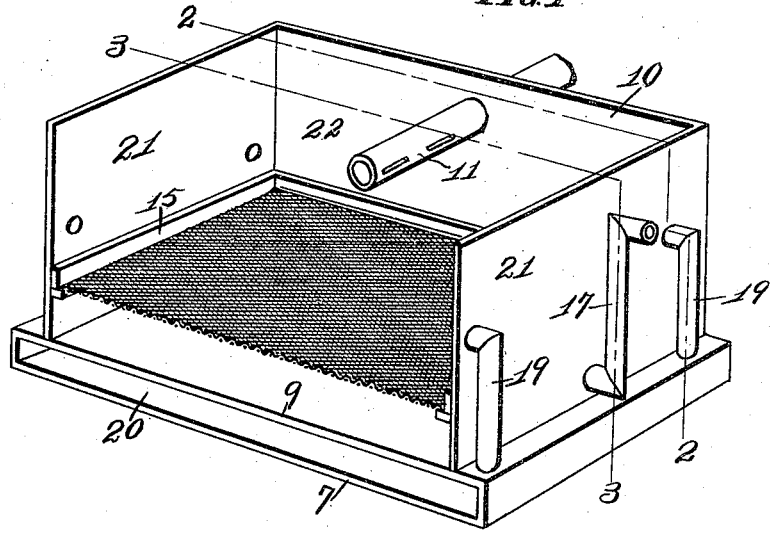
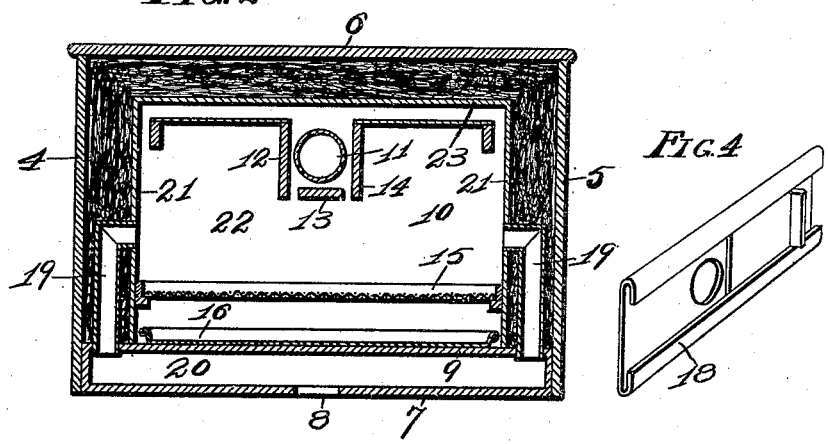
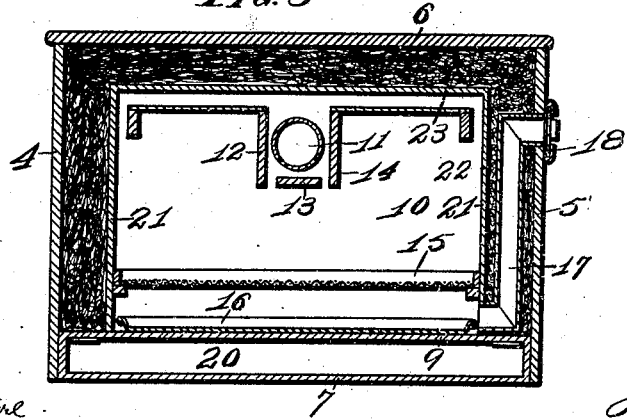
Witnesses
Inventor
James L. Nix
by Hopkins & Eicks Attys

UNITED STATES PATENT OFFICE.

JAMES L. NIX, OF HOMER CITY, PENNSYLVANIA.

INCUBATOR.

934,006.

Specification of Letters Patent.   Patented Sept. 14, 1909.

Application filed September 3, 1907.   Serial No. 391,244.

*To all whom it may concern:*

Be it known that I, JAMES L. NIX, a citizen of the United States, and resident of Homer City, Pennsylvania, have invented certain new and useful Improvements in Incubators, of which the following is a specification.

My invention relates to improvements in incubators, and has for its object to provide an egg chamber with means for securing the equable distribution of heated air above the level of the egg tray, without subjecting the eggs to ascending or descending air currents.

In the drawings—Figure 1 is a perspective view of an egg chamber embodying my invention. Fig. 2 is a transverse vertical view in mid-section of an incubator embodying my invention, taken along the line 2—2 of Fig. 1. Fig. 3 is a transverse vertical view in mid-section, taken along the line 3—3 of Fig. 1. Fig. 4 is a perspective view of the slide whereby the ventilating pipe extending from the interior of the egg chamber beneath the level of the egg tray to the exterior of the incubator is opened and closed.

As shown in the drawings, I provide an incubator having an outer housing 4 consisting of the walls 5, top 6, the bottom 7 provided with an outlet 8, and having a false bottom 9 above which the egg or incubating chamber 10 is mounted.

The egg or incubating chamber 10 comprises a top 23, a bottom 9, side walls 21, and a rear wall 22. Its front is closed by a door, not shown.

The interior of the egg chamber 10 is supplied with heated air by the flue 11, the distribution of the heated air being accomplished by means of the deflectors 12, 13 and 14.

The egg chamber 10 is provided with the egg tray 15 and the moisture tray 16, which rests beneath the tray 15 upon the false bottom 9. The ventilation pipe 17 extends from the interior of the egg chamber beneath the level of the egg tray 15 to the exterior of the incubator, and is provided at its outer end with the slide 18; this slide being kept closed in the process of incubation and only opened after incubation has been accomplished.

As the air above the egg chamber 10 becomes cooled, it finds its way downwardly through the pipes 19 which extend from the interior to the egg chamber at a point above the egg tray, downwardly through the false bottom 9 into the air chamber 20, which is formed by the bottom 7 and false bottom 9; and from the air chamber 20 the cooled air finds its outlet through the opening 8.

By means of the structure thus described, I provide a constant circulation of heated air within the egg chamber 10 without subjecting the contents of the egg tray 15 to ascending or descending air currents, the emission of the cooled air from the egg chamber 10 being accomplished by means of the pipes 19 at a point above the level of the contents of the egg tray 15.

Having fully described my invention, what I claim as new and desire to have secured to me by the grant of Letters Patent, is:

1. In an incubator, an outer housing; a false bottom mounted within the housing; side members mounted upon the false bottom, end members mounted upon the false bottom, and a top, forming with said sides, ends and false bottom an incubating chamber; means for supplying heated air to the incubating chamber at or near its top; an egg tray mounted in the incubating chamber and pipes leading from the interior of the incubating chamber at a point above the egg tray, through the false bottom, the bottom of the housing being provided with an opening, substantially as described.

2. In an incubator, an outer housing; a false bottom mounted within the housing; side members mounted upon the false bottom, end members mounted upon the false bottom, and a top forming with said sides, ends and false bottom an incubating chamber; means for supplying heated air to the incubating chamber at or near its top; an egg tray mounted in the incubating chamber; pipes leading from the interior of the incubating chamber at a point above the egg tray, through the false bottom, the bottom of the housing being provided with an opening, and a ventilation pipe leading from the interior of the egg chamber at a point beneath the level of the egg tray to the exterior of the incubator, substantially as described.

In testimony whereof, I have signed my name to this specification, in presence of two subscribing witnesses.

JAMES L. NIX.

Witnesses:
 DAVID F. BERRY,
 WM. PHILIP.